(12) United States Patent
Aso et al.

(10) Patent No.: US 10,923,971 B2
(45) Date of Patent: Feb. 16, 2021

(54) STATOR, METHOD OF MANUFACTURING STATOR, MOTOR, AND AIR CONDITIONING APPARATUS

(71) Applicant: Mitsubishi Electric Corporation, Tokyo (JP)

(72) Inventors: Hiroki Aso, Tokyo (JP); Tomoaki Oikawa, Tokyo (JP); Mineo Yamamoto, Tokyo (JP); Hiroyuki Ishii, Tokyo (JP); Junichiro Oya, Tokyo (JP); Yuto Urabe, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 383 days.

(21) Appl. No.: 15/759,364

(22) PCT Filed: Dec. 16, 2015

(86) PCT No.: PCT/JP2015/085178
§ 371 (c)(1),
(2) Date: Mar. 12, 2018

(87) PCT Pub. No.: WO2017/104016
PCT Pub. Date: Jun. 22, 2017

(65) Prior Publication Data
US 2018/0183282 A1    Jun. 28, 2018

(51) Int. Cl.
*H02K 1/18* (2006.01)
*H02K 15/02* (2006.01)
(Continued)

(52) U.S. Cl.
CPC ............... *H02K 1/187* (2013.01); *H02K 3/32* (2013.01); *H02K 5/24* (2013.01); *H02K 15/02* (2013.01); *H02K 15/12* (2013.01)

(58) Field of Classification Search
CPC ............ H02K 1/187; H02K 3/32; H02K 5/24; H02K 15/02; H02K 15/12
(Continued)

(56) References Cited

U.S. PATENT DOCUMENTS 8,008,831 B2 * 8/2011 Takeshita ............... H02K 3/487
310/214
2003/0098630 A1   5/2003 Owada et al.
(Continued)

FOREIGN PATENT DOCUMENTS

CN    104836395 A    8/2015
JP    S60-055830 A    4/1985
(Continued)

OTHER PUBLICATIONS

Office Action dated Jul. 2, 2019 issued in corresponding CN patent application No. 201580084804.7 (and English translation).
(Continued)

*Primary Examiner* — Tulsidas C Patel
*Assistant Examiner* — Rashad H Johnson
(74) *Attorney, Agent, or Firm* — Posz Law Group, PLC

(57) ABSTRACT

A stator includes a stator core having a first tooth and a second tooth adjacent to each other, a coil having a first winding portion wound around the first tooth and a second winding portion wound around the second tooth, a spacer inserted into a gap between the first winding portion and the second winding portion, and a molding resin covering the stator core, the coil, and the spacer. The spacer is shaped from a plastic material identical with a plastic material of which the molding resin is composed.

14 Claims, 13 Drawing Sheets

(51) Int. Cl.
*H02K 15/12* (2006.01)
*H02K 3/32* (2006.01)
*H02K 5/24* (2006.01)

(58) Field of Classification Search
USPC ........... 310/215, 216.001, 216.114, 216.115; 29/596
See application file for complete search history.

(56) References Cited

U.S. PATENT DOCUMENTS

| | | | |
|---|---|---|---|
| 2006/0230770 A1* | 10/2006 | Kitsch | F25B 41/046 62/151 |
| 2012/0187797 A1* | 7/2012 | Van Tiem | H02K 3/325 310/215 |
| 2013/0043743 A1* | 2/2013 | Kim | H02K 3/32 310/43 |
| 2015/0022050 A1 | 1/2015 | Sawada et al. | |
| 2015/0147953 A1* | 5/2015 | Park | F04D 27/004 454/256 |
| 2015/0229192 A1* | 8/2015 | Yoshida | H02K 5/1732 310/43 |
| 2018/0212480 A1* | 7/2018 | Aso | H02K 1/185 |

FOREIGN PATENT DOCUMENTS

| | | |
|---|---|---|
| JP | S62-182069 U | 11/1987 |
| JP | H04-017539 A | 1/1992 |
| JP | H10-271720 A | 10/1998 |
| JP | 2000-166195 A | 6/2000 |
| JP | 2003-164088 A | 6/2003 |
| JP | 2003-244880 A | 8/2003 |
| JP | 2006-115563 A | 4/2006 |
| JP | 2007-252149 A | 9/2007 |
| JP | 2008-199806 A | 8/2008 |
| WO | 2013/132935 A1 | 9/2013 |

OTHER PUBLICATIONS

International Search Report of the International Searching Authority dated Mar. 22, 2016 for the corresponding International application No. PCT/JP2015/085178 (and English translation).

Office Action dated Feb. 26, 2020 issued in corresponding CN patent application No. 201580084804.7 (and English translation).

Office action dated Aug. 14, 2018 issued in corresponding JP patent application No. 2017-555921 (and English machine translation thereof).

Office Action dated May 29, 2020 issued in corresponding CN patent application No. 201580084804.7 (and English translation).

* cited by examiner

US 10,923,971 B2

STATOR, METHOD OF MANUFACTURING STATOR, MOTOR, AND AIR CONDITIONING APPARATUS

CROSS REFERENCE TO RELATED APPLICATION

This application is a U.S. national stage application of International Patent Application No. PCT/JP2015/085178 filed on Dec. 16, 2015, the disclosure of which is incorporated herein by reference.

TECHNICAL FIELD

The present invention relates to a stator for use in a motor, a method of manufacturing the stator, the motor, and an air conditioning apparatus using the motor.

BACKGROUND ART

A stator of a molded motor is manufactured by winding a coil around a stator core and integrally molding the coil and the stator core using a molding resin. In recent years, reduction of the amount of use of the molding resin is required in order to reduce manufacturing cost.

Accordingly, a technique is proposed in which a resin thermally cured in a runner of a mold in previous molding is placed in a cavity of the mold in next molding so that the resin is integrated with a molding resin injected into the cavity (see, for example, Patent Reference 1).

Moreover, another technique is proposed in which a ring-shaped groove is provided at an axial end surface of a stator so as to reduce the amount of use of a molding resin by an amount corresponding to a volume of the groove (see, for example, Patent Reference 2).

Patent Reference 1: Japanese Patent Application Publication No. 2000-166195 (see FIG. 1)

Patent Reference 2: Japanese Patent Application Publication No. H10-271720 (see paragraph 0028)

In recent years, however, further reduction of the amount of use of the molding resin is required in order to further reduce manufacturing cost.

SUMMARY

The present invention is intended to solve the above described problem, and an object of the present invention is to reduce the amount of use of the molding resin.

A stator according to the present invention includes a stator core having a first tooth and a second tooth adjacent to each other, a coil having a first winding portion wound around the first tooth and a second winding portion wound around the second tooth, a spacer inserted into a gap between the first winding portion and the second winding portion, and a molding resin covering the stator core, the coil and the spacer. The spacer is shaped from a plastic material identical with a plastic material of which the molding resin is composed.

A motor according to the present invention includes a stator and a rotor provided inside the stator. The stator includes a stator core having a first tooth and a second tooth adjacent to each other, a coil having a first winding portion wound around the first tooth and a second winding portion wound around the second tooth, a spacer inserted into a gap between the first winding portion and the second winding portion, and a molding resin covering the stator core, the coil and the spacer. The spacer is shaped from a plastic material identical with a plastic material of which the molding resin is composed.

An air conditioning apparatus according to the present invention includes an outdoor unit having a first fan and a first motor to drive the first fan, an indoor unit having a second fan and a second motor to drive the second fan, and a refrigerant pipe connecting the outdoor unit and the indoor unit. At least one of the first motor and the second motor has a stator and a rotor provided inside the stator. The stator includes a stator core having a first tooth and a second tooth adjacent to each other, a coil having a first winding portion wound around the first tooth and a second winding portion wound around the second tooth, a spacer inserted into a gap between the first winding portion and the second winding portion, and a molding resin covering the stator core, the coil and the spacer. The spacer is shaped from a plastic material identical with a plastic material of which the molding resin is composed.

A method of manufacturing a stator according to the present invention includes the steps of preparing a stator core having a first tooth and a second tooth adjacent to each other, winding a first winding portion of a coil around the first tooth and winding a second winding portion of the coil around the second tooth, inserting a spacer into a gap between the first winding portion and the second winding portion, the spacer being shaped from a plastic material identical with a plastic material of which a molding resin is composed, and integrally molding the stator core, the coil and the spacer using the molding resin.

According to the present invention, since the spacer shaped from the plastic material identical with the plastic material of which the molding resin is composed is inserted into the gap between the first winding portion and the second winding portion, the amount of use of the molding resin can be further reduced, and thus manufacturing cost can be further reduced.

DETAILED DESCRIPTION

First Embodiment

Figure 1:
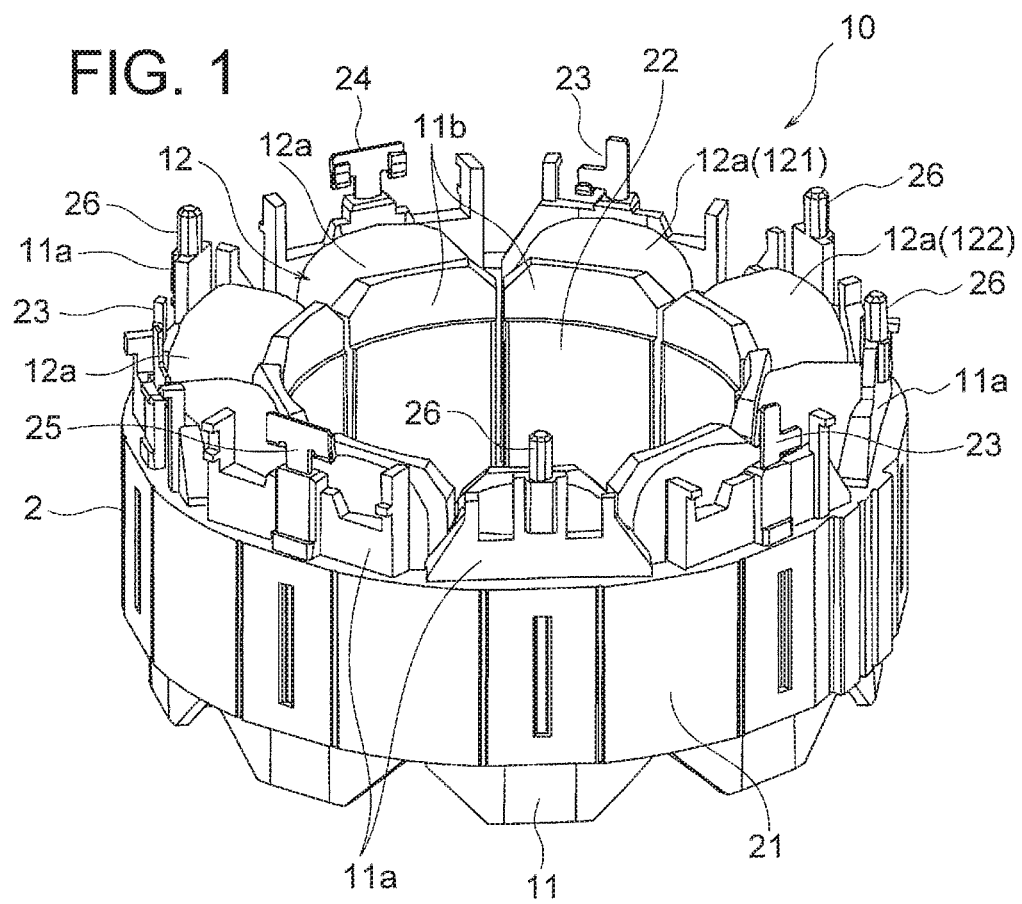
FIG. 1 is a perspective view illustrating a structure of a stator assembly of a first embodiment of the present invention.

FIG. 1 is a perspective view illustrating a structure of a stator assembly 10 according to a first embodiment of the present invention. The stator assembly 10 constitutes a stator (FIG. 9) of a motor 100 (FIG. 10) described later. As illustrated in FIG. 1, the stator assembly 10 includes a stator core 2, an insulating portion (an insulator) 11 provided on the stator core 2, and a coil 12 wound around the stator core 2 via the insulating portion 11.

Figure 2:
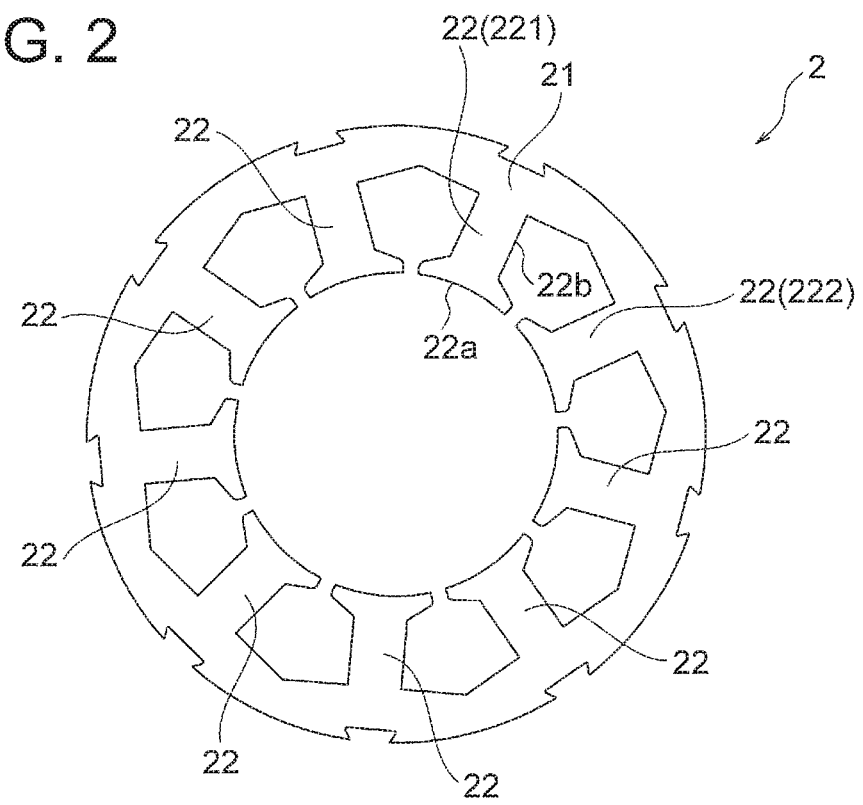
FIG. 2 is a plan view illustrating a structure of a stator core of the first embodiment.

FIG. 2 is a plan view illustrating a structure of the stator core 2. The stator core 2 is formed in an annular shape as a whole. The stator core 2 includes a yoke 21 constituting an outer circumferential portion and a plurality of teeth 22 extending radially inward from the yoke 21. A slot is formed between the teeth 22 adjacent to each other. Nine teeth 22 are arranged at equal intervals in a circumferential direction of the stator core 2 in this example, but the number of the teeth is not specifically limited. For example, among the plurality of teeth 22 of the stator core 2, any two teeth 22 that are adjacent to each other in the circumferential direction are referred to as a first tooth 221 and a second tooth 222.

In the following description, a direction of a center axis of the annular stator core 2 is referred to as an axial direction of the stator core 2 (or an axial direction of the stator assembly 10). Moreover, a direction along an outer circumference (a circumference of a circle) of the stator core 2 is referred to as a circumferential direction of the stator core 2 (or a circumferential direction of the stator assembly 10).

The tooth 22 includes an inner circumferential end 22a on a side opposite to the yoke 21. Moreover, the tooth 22 includes coil holding surfaces 22b around which the coil 12 (FIG. 1) is wound. The stator core 2 is covered with the insulating portion (FIG. 1) except for the inner circumferential ends 22a of the teeth 22 and an outer circumferential surface of the yoke 21. This insulating portion 11 insulates the stator core 2 and the coil 12 from each other.

The stator core 2 is obtained by stacking a plurality of electromagnetic steel sheets punched into strip shapes and then by fixing the stacked electromagnetic steel sheets with each other by caulking, welding, or bonding. In this example, the stator core 2 has a structure in which the stator core 2 is divided into a plurality of blocks, and the number of the blocks (nine in this example) is equal to the number of the teeth 22.

Before the stator core 2 is assembled into an annular shape, the stator core 2 is in the form of a strip-shaped connecting body in which the nine blocks are connected with each other in a row. The insulating portion 11 is integrally molded with or assembled to the strip-shaped connecting body, the coil 12 (a magnet wire) is wound around each tooth 22, and then ends of the strip-shaped connecting body are welded with each other. In this manner, the annular stator core 2 illustrated in FIG. 2 is formed. In this regard, the stator core 2 is not limited to a structure in which the stator core 2 is divided into a plurality of blocks.

Referring back to FIG. 1, the insulating portion 11 is formed by integrally molding a thermoplastic resin such as polybutylene terephthalate (PBT) with the stator core 2, or by assembling a molded body of a thermoplastic resin preliminarily molded to the stator core 2.

The insulating portion 11 includes portions covering the coil holding surfaces 22b (FIG. 2) of the teeth 22, an outer wall portion 11a supporting the coil 12 to prevent the coil 12 from falling outward, and an inner wall portion 11b supporting the coil 12 to prevent the coil 12 from falling inward. The outer wall portion 11a and the inner wall portion 11b of the insulating portion 11 are formed to protrude from the coil 12 on both sides (both of top and bottom sides in FIG. 1) of the stator assembly 10 in the axial direction.

The coil 12 is formed by winding, for example, magnet wires around the teeth 22. Portions of the coil 12 wound around the teeth 22 are referred to as winding portions 12a. For example, the winding portion 12a wound around the first tooth 221 illustrated in FIG. 2 is referred to as a first winding portion 121, and the winding portion 12a wound around the second tooth 222 is referred to as a second winding portion 122.

The coil 12 is formed of three-phase windings. Three power terminals 23 and two neutral point terminals 24 and 25 to which parts of the coil 12 of respective phases (U-phase, V-phase, and W-phase) are connected are attached to the outer wall portion 11a of the insulating portion 11.

The parts of the coil 12 of the respective phases (U-phase, V-phase, and W-phase) are joined to the power terminals 23 and the neutral point terminals 24 and 25 by fusing (thermal caulking), soldering or the like. In this regard, detailed description of connection between the parts of the coil 12 of the respective phases and the power terminals 23 and the neutral point terminals 24 and 25 is omitted.

In this regard, in the axial direction of the stator core 2, a side on which the power terminals 23 and the neutral point terminal 24 are provided (an upper side in FIG. 1) is referred to as a connection side, and its opposite side (a lower side in FIG. 1) is referred to as a counter-connection side.

A plurality of (four in this example) pins 26 for fixing a lead wire wiring component 3 (FIG. 3) are formed to protrude from the outer wall portion 11a of the insulating portion 11. Moreover, a plurality of projections 11c (FIG. 10) for positioning the stator assembly 10 with respect to a molding mold described later are provided on an end portion of the inner wall portion 11b on the counter-connection side.

Figure 3:
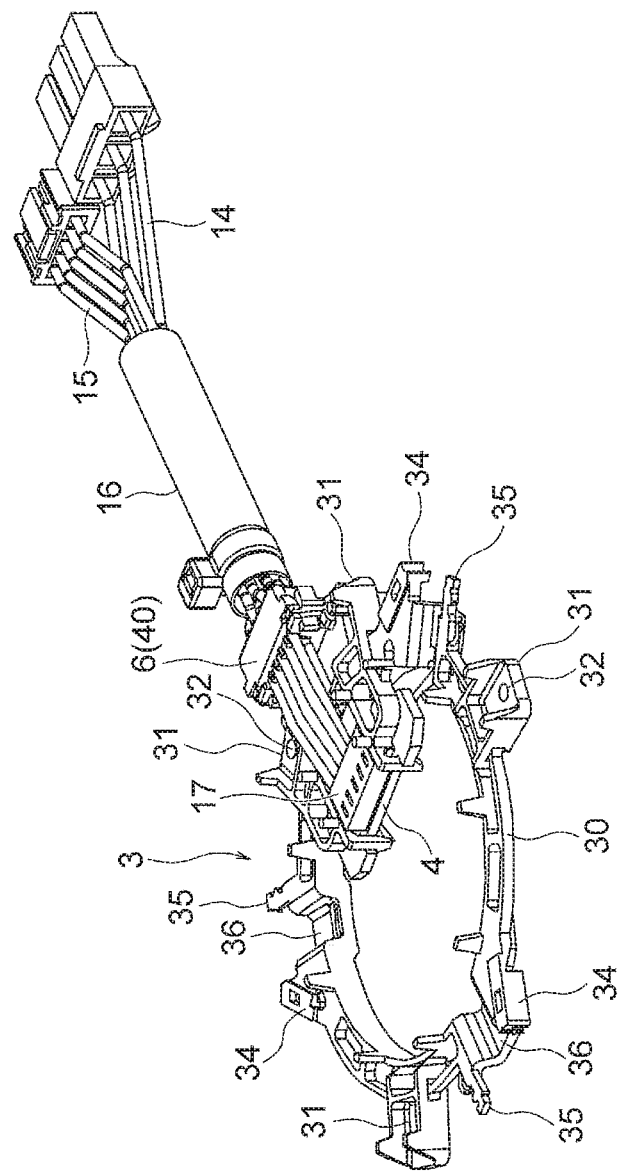
FIG. 3 is a perspective view illustrating a structure of a lead wire wiring component of the first embodiment.

Next, the lead wire wiring component 3 as a wiring component will be described. The lead wire wiring component 3 is attached to the connection side of the stator assembly 10 (obtained by attaching the insulating portion 11 and the coil 12 to the stator core 2). FIG. 3 is a perspective view of the lead wire wiring component 3 as viewed from a side opposite to the stator assembly 10.

Power lead wires 14 and sensor lead wires 15 are attached to the lead wire wiring component 3. In this example, three power lead wires 14 and five sensor lead wires 15 are collected in a bundle and constitute a lead wire group 16. A board-in connector 17 is attached to tips (ends on the lead wire wiring component 3 side) of the sensor lead wires 15.

The lead wire wiring component 3 is composed of a thermoplastic resin such as PBT, and includes an annular plate portion 30 to be attached to the stator assembly 10. The annular plate portion 30 includes a plurality of (four in this example) leg portions 31 that contact an upper surface of the outer wall portion 11a (FIG. 1) when the lead wire wiring component 3 is attached to the stator assembly 10. The leg portions 31 are formed to protrude further radially outward from an outer circumference of the annular plate portion 30. The leg portions 31 have holes 32 that engage with the pins 26 (FIG. 1) of the stator assembly 10.

The leg portions 31 contact the upper surface of the outer wall portion 11a, and thus an axial position of the lead wire wiring component 3 relative to the stator assembly 10 is determined. Moreover, the pins 26 of the stator assembly 10 engage with the holes 32 of the leg portions 31, and thus a circumferential position of the lead wire wiring component 3 is determined.

Figure 4:
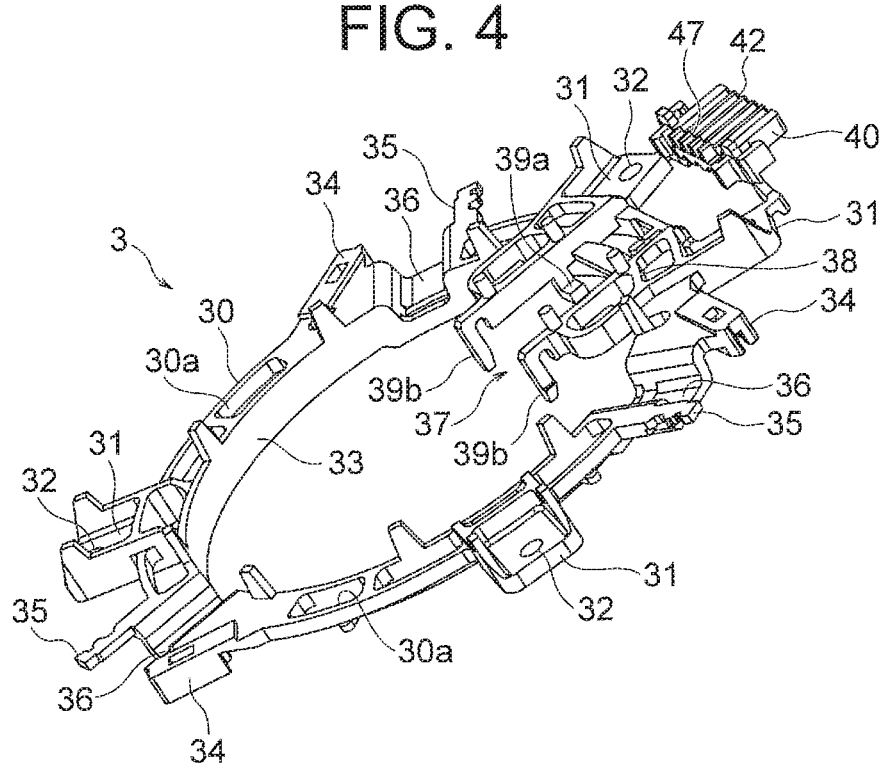
FIG. 4 is a perspective view of an annular plate portion of the lead wire wiring component of the first embodiment as viewed from a side opposite to the stator assembly.
Figure 5:
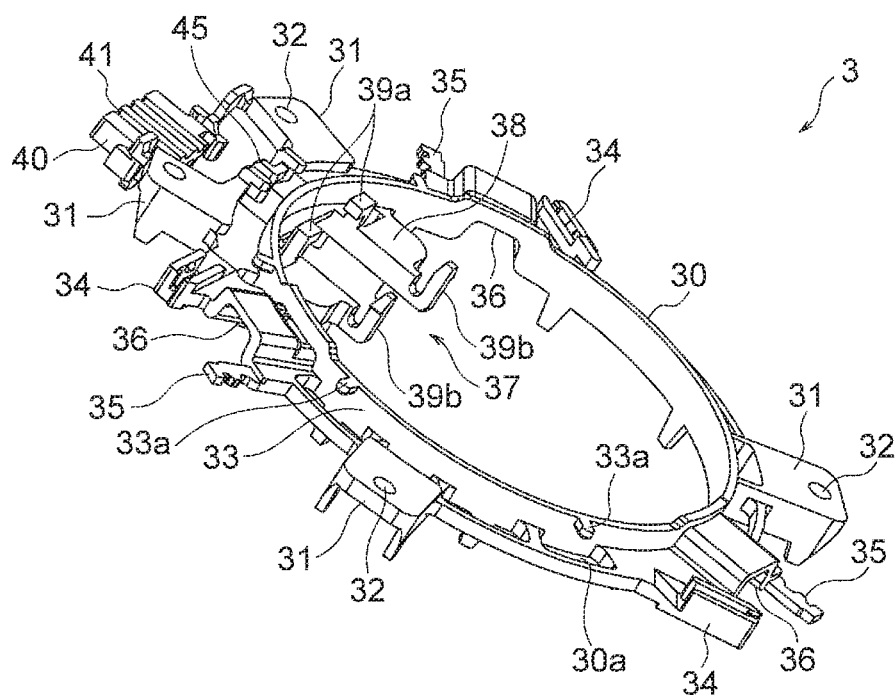
FIG. 5 is a perspective view of the annular plate portion of the lead wire wiring component of the first embodiment as viewed from the stator assembly side.

FIG. 4 is a perspective view of the annular plate portion 30 as viewed from the side opposite to the stator assembly 10. FIG. 5 is a perspective view of the annular plate portion 30 as viewed from the stator assembly 10 side. The annular plate portion 30 is a plate member having an annular shape. A lead-out portion 40 is provided at a position in the circumferential direction of the annular plate portion 30 and protrudes outward in a radial direction of the annular plate portion 30. Moreover, a plurality of openings 30a are formed throughout an entire region of the annular plate portion 30 in the circumferential direction.

An inner circumferential wall 33 along which the power lead wires 14 are drawn is provided along an inner circumferential edge of the annular plate portion 30. Positional displacement preventing pins 33a (FIG. 5) for preventing positional displacement of the power lead wires 14 are formed at a plurality of positions on the inner circumferential wall 33.

Covered terminal holding portions 34 for holding terminal portions of the power lead wires 14 are provided at a plurality of positions (three positions in this example) on the outer circumference of the annular plate portion 30, and the number of the positions corresponds to the number of the power lead wires 14. Moreover, core wire holding portions 35 are disposed apart from the corresponding covered terminal holding portions in the circumferential direction of the annular plate portion 30.

The terminal portions of the power lead wires 14 (FIG. 3) are held by the covered terminal holding portions 34, and uncovered core wires of the power lead wires 14 are held by the core wire holding portions 35. When the lead wire wiring component 3 is attached to the stator assembly 10 as described later, the power terminals 23 of the stator assembly 10 (FIG. 1) are located between the covered terminal holding portions 34 and the core wire holding portions 35. The core wires of the power lead wires 14 held between the covered terminal holding portions 34 and the core wire holding portions 35 are joined to the power terminals 23 by spot welding or soldering. Thus, recesses 36 for leaving spaces for electrodes used in spot welding of the power terminals 23 and the core wires are provided between the covered terminal holding portions 34 and the core wire holding portions 35 of the annular plate portion 30.

A sensor board holding portion 37 for holding a sensor board 4 (FIG. 3) is formed on a radially inner side of the lead-out portion 40 of the lead wire wiring component 3. The sensor board holding portion 37 is a portion extending radially inward from the annular plate portion 30, and the sensor board 4 is held on an upper surface (a surface facing the stator assembly 10) of the sensor board holding portion 37 in FIG. 5.

The sensor board holding portion 37 includes a pair of board holding portions 38 (FIG. 5) extending in parallel with a plate surface of the annular plate portion 30. The pair of board holding portions 38 are disposed at a distance from each other in the circumferential direction of the annular plate portion 30. An assembly leg 39a and an assembly leg 39b are provided on each of the board holding portions 38. In the radial direction of the annular plate portion 30, the assembly leg 39a is disposed on a radially outer side and the assembly leg 39b is disposed on a radially inner side.

The sensor board 4 illustrated in FIG. 3 is a board on which electronic components such as a Hall integrated circuit (IC) are mounted and a sensor circuit for detecting a position of the rotor 7 is formed. The sensor board 4 includes a joint portion to be joined to the board-in connector 17 of the sensor lead wires 15.

The sensor board 4 has a cutout portion on an inner end portion of the sensor board 4 in the radial direction of the annular plate portion 30, and the cutout portion engages with the above described assembly leg 39a. The sensor board 4 also has a groove (not shown in the figure) on an outer end portion of the sensor board 4 in the radial direction of the annular plate portion 30, and the groove engages with the assembly leg 39b. The sensor board 4 contacts the board holding portions 38, engages with the assembly legs 39a and 39b, and is thereby held by the sensor board holding portion 37. Moreover, contact between the sensor board 4 and the board holding portions 38 prevents deformation of the sensor board 4 due to a pressure (a resin pressure) applied during molding described later.

Next, a structure of the lead-out portion 40 of the lead wire wiring component 3 will be described. The lead-out portion 40 is a portion protruding radially outward from the annular plate portion 30. Three power lead wire holding grooves 41 (FIG. 5) for holding the power lead wires 14 are formed on a surface of the lead-out portion 40 on the stator assembly 10 side.

Five sensor lead wire holding grooves 42 (FIG. 4) for holding the sensor lead wires 15 are formed on a surface of the lead-out portion 40 on a side opposite to the stator assembly 10. Four holding projections 47 are formed each between adjacent ones of the sensor lead wire holding grooves 42.

Figure 6:
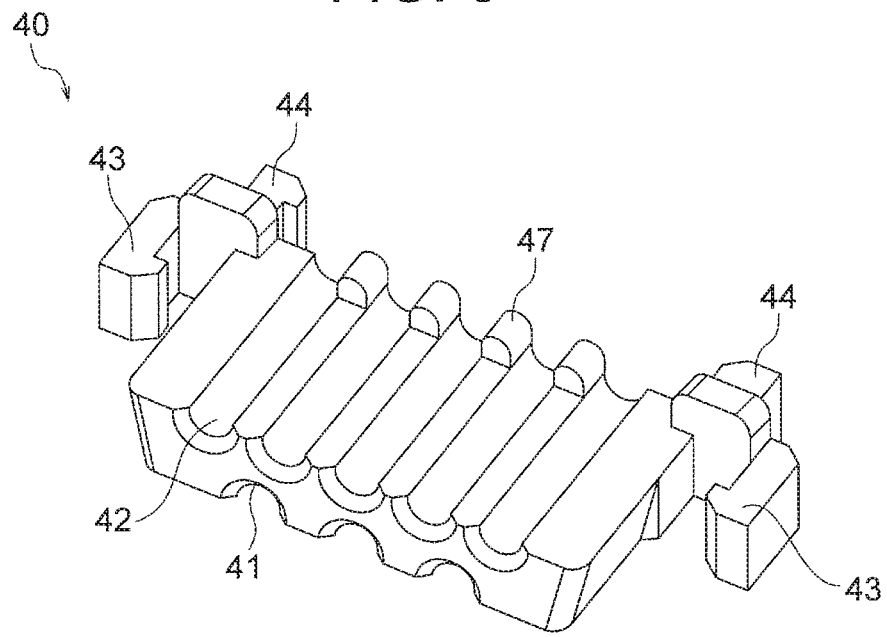
FIG. 6 is a perspective view illustrating a structure of a lead-out portion of the lead wire wiring component of the first embodiment.

FIG. 6 is a perspective view of the lead-out portion 40 of the lead wire wiring component 3 as viewed from the side opposite to the stator assembly 10. As illustrated in FIG. 6, a pair of first engaging portions 43 are formed to protrude from both sides of the lead-out portion 40 in a widthwise direction (i.e., both sides in the circumferential direction of the annular plate portion 30). The first engaging portions 43 extend outward in the radial direction of the annular plate portion 30. Attachment legs 63 (FIG. 8) of a sensor lead wire holding component 6 described later engage with the first engaging portions 43.

A pair of second engaging portions 44 are formed to protrude from both sides of the lead-out portion 40 at inner positions relative to the pair of first engaging portion 43 in the widthwise direction. The second engaging portions 44 extend inward in the radial direction of the annular plate portion 30. Attachment legs 53 (FIG. 7) of a power lead wire holding component 5 described later engage with the second engaging portions 44.

The power lead wire holding component 5 (FIG. 7) for holding the power lead wires 14 is attached to a side of the lead-out portion 40 on the stator assembly 10 side. Moreover, the sensor lead wire holding component 6 (FIG. 8) for holding the sensor lead wires 15 is attached to a side of the lead-out portion 40 opposite to the stator assembly 10.

Figure 7:
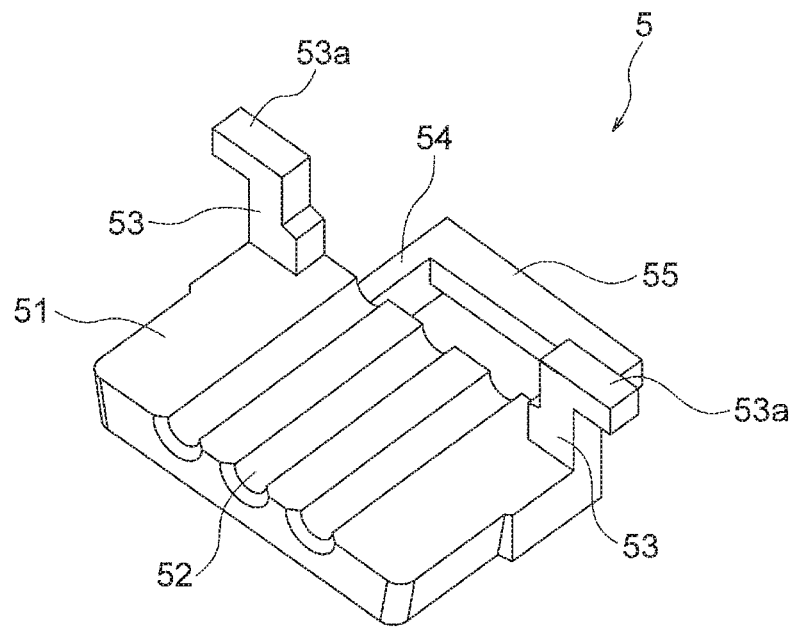
FIG. 7 is a perspective view illustrating a structure of a power lead wire holding component of the first embodiment.

FIG. 7 is a perspective view illustrating a shape of the power lead wire holding component 5. The power lead wire holding component 5 includes a plate-shaped base portion 51 on which three grooves 52 for holding the power lead wires 14 are formed, and a pair of attachment legs 53 protruding toward the lead wire wiring component 3 from both ends of the base portion in the widthwise direction (i.e., both ends in the circumferential direction of the annular plate portion 30). Projections 53a are formed on the pair of attachment legs 53 to protrude in opposite directions. The attachment legs 53 are disposed at an inner end portion of the base portion 51 in the radial direction of the annular plate portion 30.

Moreover, a pair of ribs 54 extending further radially inward and an arm 55 connecting tips of the pair of ribs 54 are formed on an inner edge of the base portion 51 in the radial direction of the annular plate portion 30.

The attachment legs 53 of the power lead wire holding component 5 engage with the second engaging portions 44 (FIG. 6) of the lead-out portion 40 from inside in the radial direction of the annular plate portion 30. In this manner, the power lead wire holding component 5 is attached to the lead-out portion 40. The power lead wires 14 (FIG. 3) are held between the power lead wire holding grooves 41 of the lead-out portion 40 and the grooves 52 of the power lead wire holding component 5. In this regard, the arm 55 (FIG. 7) of the power lead wire holding component 5 is provided for preventing detachment of the power lead wires 14.

As illustrated in FIG. 5, the annular plate portion 30 is provided with three folding pins 45 for folding the three power lead wires 14 drawn along the inner circumferential wall 33 from the lead-out portion 40. The three folding pins 45 are arranged in the circumferential direction of the annular plate portion 30. A projection for preventing positional displacement of the power lead wire 14 is formed at a tip of each of the folding pins 45.

The power lead wire 14 held by a center one of the three power lead wire holding grooves 41 of the lead-out portion 40 is folded by the center folding pin 45, is drawn along the inner circumferential wall 33, and is attached to the covered terminal holding portion 34 located at a position 180 degrees from the lead-out portion 40. The other two power lead wires 14 are folded by the corresponding folding pins 45, are drawn along the inner circumferential wall 33, and are attached to the two covered terminal holding portions 34 disposed on both sides of the lead-out portion 40 in the circumferential direction of the annular plate portion 30.

Figure 8:
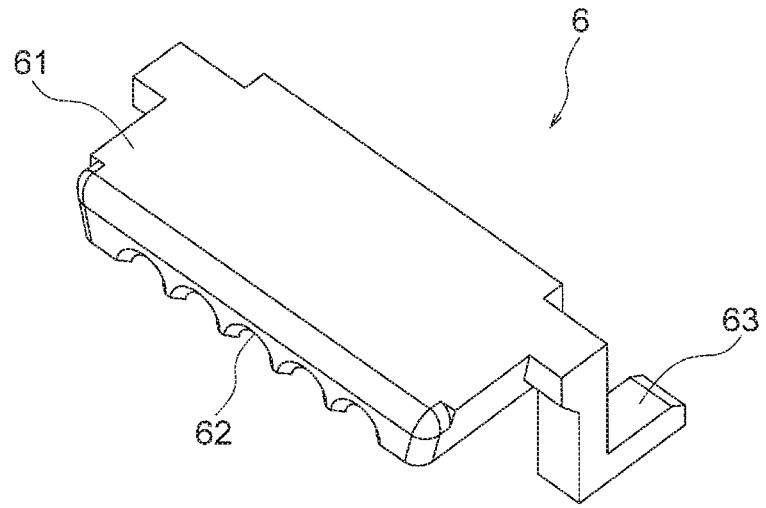
FIG. 8 is a perspective view illustrating a structure of a sensor lead wire holding component of the first embodiment.

FIG. 8 is a perspective view illustrating a shape of the sensor lead wire holding component 6. The sensor lead wire holding component 6 includes a plate-shaped base portion 61 on which five grooves 62 for holding the sensor lead wires 15 are formed, and a pair of attachment legs 63 protruding toward the lead wire wiring component 3 from both ends of the base portion in the widthwise direction (i.e., the circumferential direction of the annular plate portion 30). Each of the attachment legs 63 has a tip extending inward in the radial direction of the annular plate portion 30.

The attachment legs 63 of the sensor lead wire holding component 6 engage with the first engaging portions 43 (FIG. 6) of the lead-out portion 40 from outside in the radial direction of the annular plate portion 30. In this manner, the sensor lead wire holding component 6 is attached to the lead-out portion 40. The sensor lead wires 15 (FIG. 3) are held between the sensor lead wire holding grooves 42 of the lead-out portion 40 and the grooves 62 of the sensor lead wire holding component 6. The sensor lead wires 15 are held between the four holding projections 47 and between the holding projections 47 and the attachment legs 53 (FIG. 7), and are drawn on a surface of the annular plate portion 30 opposite to a surface on which the power lead wires 14 are arranged.

The board-in connector 17 (FIG. 3) at the tips of the sensor lead wires 15 is joined by, for example, soldering to the joint portion of the sensor board 4 held by the sensor board holding portion 37. In this manner, the sensor circuit mounted on the sensor board 4 is connected to external equipment through the sensor lead wires 15.

Figure 9:
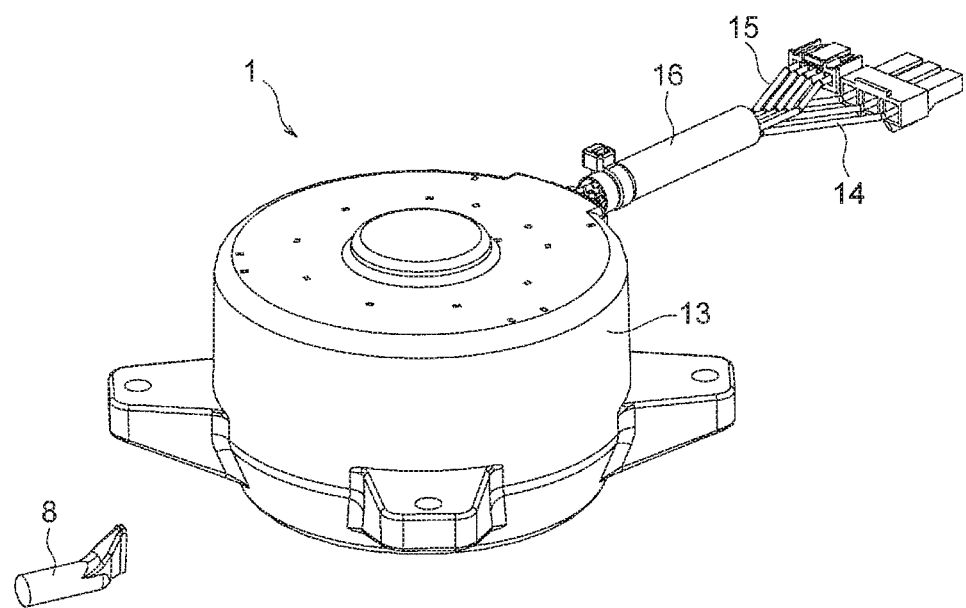
FIG. 9 is a perspective view illustrating a stator and a spacer of the first embodiment.
Figure 10:
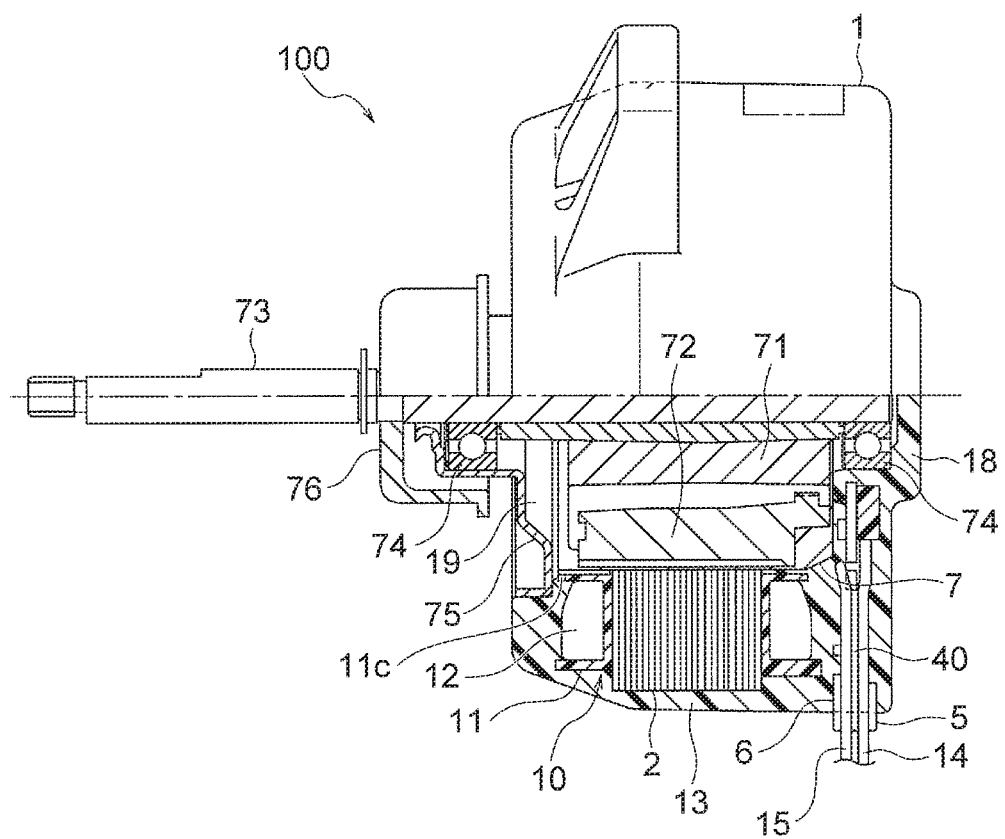
FIG. 10 is a partial sectional view illustrating a structure of a motor including the stator of the first embodiment.

Next, a molding resin 13 will be described. FIG. 9 is a perspective view illustrating the stator 1 (also referred to as a molded stator) in which the stator assembly 10 and the lead wire wiring component 3 are molded using the molding resin 13. FIG. 10 is a partial sectional view illustrating a motor 100 (also referred to as a molded motor) including the stator 1.

The molding resin 13 is a thermosetting resin such as a bulk molding compound (BMC). The molding resin 13 covers the stator assembly 10 from radially outside and from both sides in the axial direction in such a manner as to expose an inner circumferential surface of the stator assembly 10, i.e., the inner circumferential ends 22a of the teeth 22 illustrated in FIG. 2.

The molding resin 13 is injected into a cavity of a molding mold in which the stator 1 is placed, and is cured by heating. In order to reduce the amount of use of the molding resin, spacers 8 made of a resin cured in a runner of the molding mold in the previous molding are used. The spacers 8 will be described later. FIG. 9 also illustrates one of the spacers 8.

As illustrated in FIG. 10, in the axial direction of the stator assembly 10, an end portion 18 on a side to which the lead wire wiring component 3 is attached is covered with the molding resin 13. In this regard, a part of the lead-out portion 40, a part of the power lead wire holding component 5, and a part of the sensor lead wire holding component 6 are exposed. In the axial direction of the stator assembly 10, an opening 19 is formed on an end portion on a side opposite to the lead wire wiring component 3.

Next, the motor 100 of this embodiment will be described. As illustrated in FIG. 10, the motor 100 of this embodiment includes the stator 1 in which the stator assembly 10 and the lead wire wiring component 3 are integrally molded using the molding resin 13, and the rotor 7 rotatably inserted inside the stator 1. The rotor 7 is inserted through the opening 19 of the stator 1, and faces the inner circumferential ends 22a of the teeth 22 of the stator 1 (FIG. 2).

The rotor 7 includes a cylindrical rotor core 71 formed of a stack of electromagnetic steel sheets and a plurality of permanent magnets 72 buried in the rotor core 71. The permanent magnets 72 are arranged at equal intervals in the circumferential direction of the rotor core 71.

A shaft 73 serving as a rotating shaft is integrally attached to a center of the rotor core 71. The shaft 73 is supported by a pair of bearings 74. One of the bearings 74 is held by the molding resin 13 at the end portion 18 of the stator assembly 10. The other one of the bearings 74 is held by a bracket 75 provided in the opening 19 of the stator assembly 10.

Figure 11:
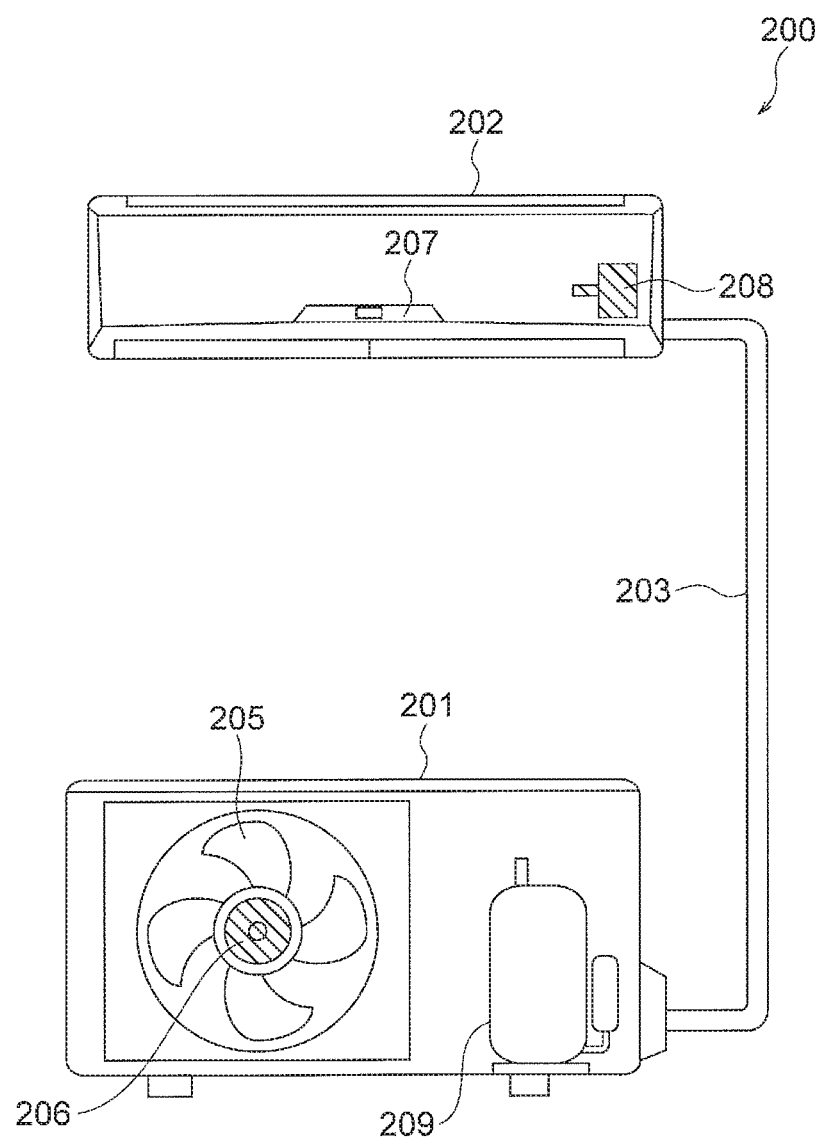
FIG. 11 is a view illustrating a structural example of an air conditioning apparatus including the motor of the first embodiment.

Next, an air conditioning apparatus 200 of this embodiment will be described. FIG. 11 is a view illustrating a structural example of the air conditioning apparatus 200 including the motor 100 of this embodiment. The air conditioning apparatus 200 includes an outdoor unit 201, an indoor unit 202, and a refrigerant pipe 203 connecting these units.

The outdoor unit 201 includes a first fan (blower) 205 and a first motor 206 for driving the first fan 205. The indoor unit 202 includes a second fan 207 and a second motor 208 for driving the second fan 207. At least one of the first motor 206 and the second motor 208 is constituted by the motor 100 of this embodiment. In this regard, FIG. 11 also illustrates a compressor 209 for compressing refrigerant in the outdoor unit 201.

Figure 12:
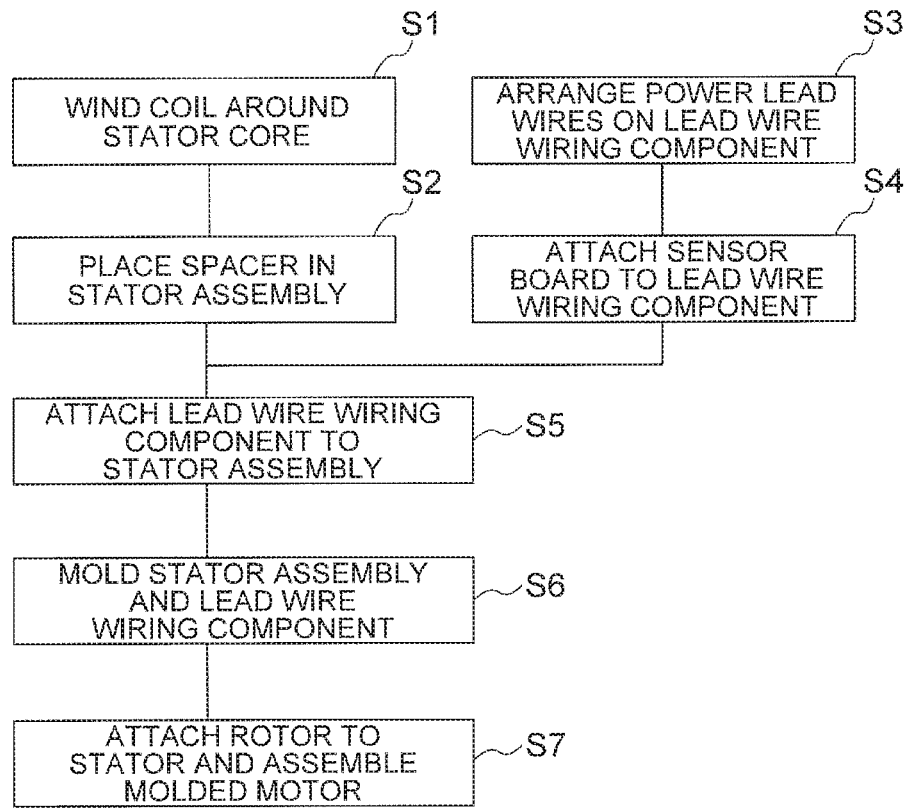
FIG. 12 is a flowchart for describing a manufacturing process of the stator of the first embodiment.

Next, a method of manufacturing the stator 1 will be described. FIG. 12 is a flowchart for describing a method of manufacturing the stator 1 of the first embodiment.

First, an insulating portion 11 is formed by molding a thermoplastic resin integrally with the stator core 2 formed of a stack of electromagnetic steel sheets, or by attaching a previously molded thermoplastic resin to the stator core 2. In addition, the coil 12 is wound around the teeth 22 of the stator core 2 via the insulating portion 11, and thereby the stator assembly 10 illustrated in FIG. 1 is manufactured (step S1). For example, the first winding portion 121 and the second winding portion 122 of the coil 12 (FIG. 1) are respectively wound around the first tooth 221 and the second tooth 222 illustrated in FIG. 2.

Next, the spacers 8 shaped from a plastic material that is identical with a plastic material (for example, a thermosetting resin such as BMC) of which the molding resin 13 is composed are placed in the stator assembly 10 (step S2). The spacers 8 are made of, for example, a resin cured in the runner of the molding mold in a previous molding step.

Figure 13:
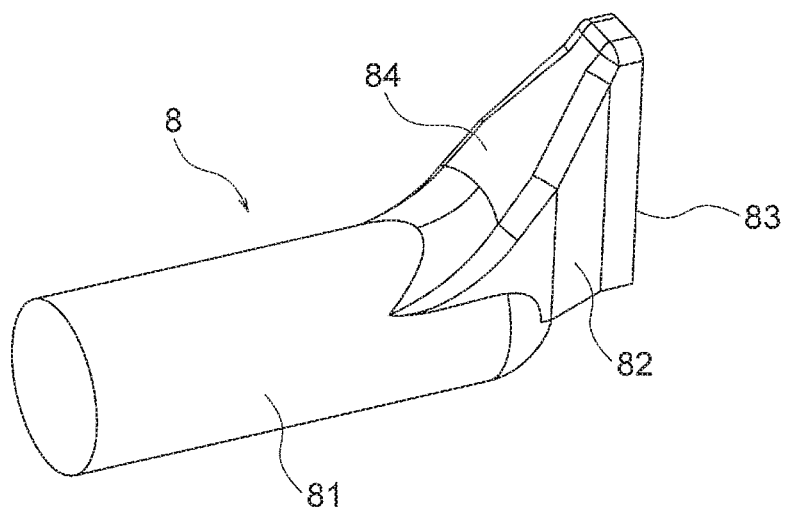
FIG. 13 is a perspective view illustrating a shape of the spacer of the first embodiment.
Figure 14:
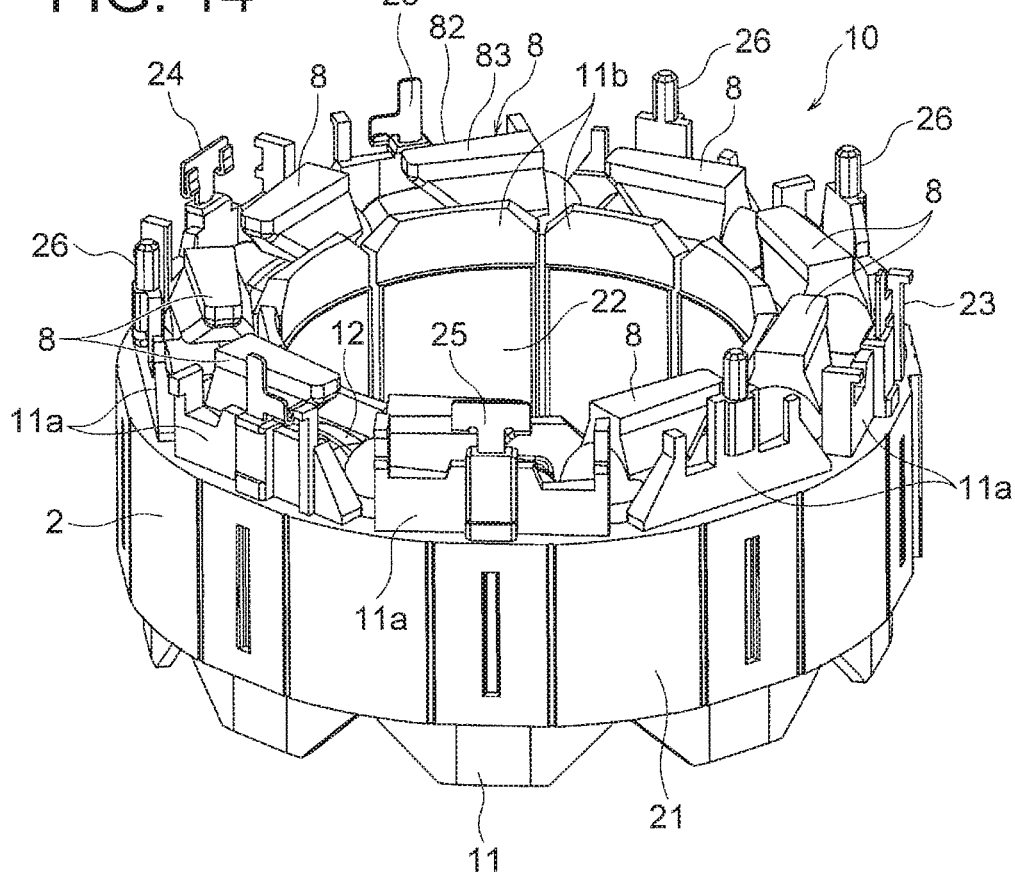
FIG. 14 is a perspective view illustrating a state in which the spacers are placed in the stator assembly of the first embodiment.

FIG. 13 is a perspective view illustrating the spacer 8. FIG. 14 is a view illustrating a state in which the spacers 8 are placed in the stator assembly 10.

As illustrated in FIG. 13, the spacer 8 includes an insertion portion 81 having a cylindrical shape and an engaging portion 82 formed at an end portion of the insertion portion 81 in an axial direction of the insertion portion 81. The insertion portion 81 has a diameter smaller than a distance between the adjacent winding portions 12a of the coil 12. The shape of the insertion portion 81 is not limited to the cylindrical shape, but may be, for example, a prism shape.

The engaging portion 82 has a shape protruding from the insertion portion 81 in a cross section perpendicular to the axial direction of the insertion portion 81. More specifically, the engaging portion 82 extends in a direction perpendicular to the axial direction of the insertion portion 81 (i.e., in a radial direction of the insertion portion 81).

An end surface 83 of the engaging portion 82 of the spacer 8 on a side opposite to the insertion portion 81 is a surface facing the lead wire wiring component 3. Moreover, the spacer 8 has a curved portion 84 whose shape continuously changes from the insertion portion 81 to the engaging portion 82. This shape corresponds to the shape of the runner of the molding mold (FIG. 16) described later.

In FIG. 14, the winding portions 12a of the coil 12 are wound around the teeth 22 of the stator core 2. The insertion portion 81 of each spacer 8 is inserted into a gap between adjacent ones of the winding portions 12a of the coil 12. The insertion portion 81 of the spacer 8 is inserted between, for example, the first winding portion 121 and the second winding portion 122 illustrated in FIG. 1.

Moreover, the engaging portions 82 of the spacers 8 contact upper surfaces of the winding portions 12a and thereby prevent the spacers 8 from falling down through the gaps between the winding portions 12a.

Since the engaging portions 82 of the spacers 8 extend in the direction perpendicular to the axial direction of the insertion portions 81, the spacers 8 can be arranged so that extending directions of the engaging portions 82 are oriented in the circumferential direction of the stator assembly 10. Thus, the engaging portions 82 can be efficiently arranged between the outer wall portion 11a and the inner wall portion 11b of the stator assembly 10.

Referring back to FIG. 12, arrangement of the power lead wires 14 on the lead wire wiring component 3 (step S3) and attachment of the sensor board 4 to the lead wire wiring component 3 (step S4) are performed concurrently with steps S1 and S2.

Specifically, three power lead wires 14 are disposed on the lead-out portion 40 of the lead wire wiring component 3, are drawn along the inner circumferential wall 33 of the lead wire wiring component 3, and are attached to the corresponding covered terminal holding portions 34. In addition, uncovered terminal portions of the power lead wires 14 are attached to the corresponding core wire holding portions 35. Then, the power lead wire holding component 5 is attached to the lead-out portion 40 (step S3).

Then, the sensor board 4 is attached to the lead wire wiring component 3, the sensor lead wires 15 are disposed on the lead-out portion 40, and the board-in connector 17 of the sensor lead wires 15 is joined to the joint portion of the sensor board 4 by soldering. Then, the sensor lead wire holding component 6 is attached to the lead-out portion 40 (step S4).

Steps S3 and S4 may be performed before, after or at the same time as steps S1 and S2 described above.

Figure 15:
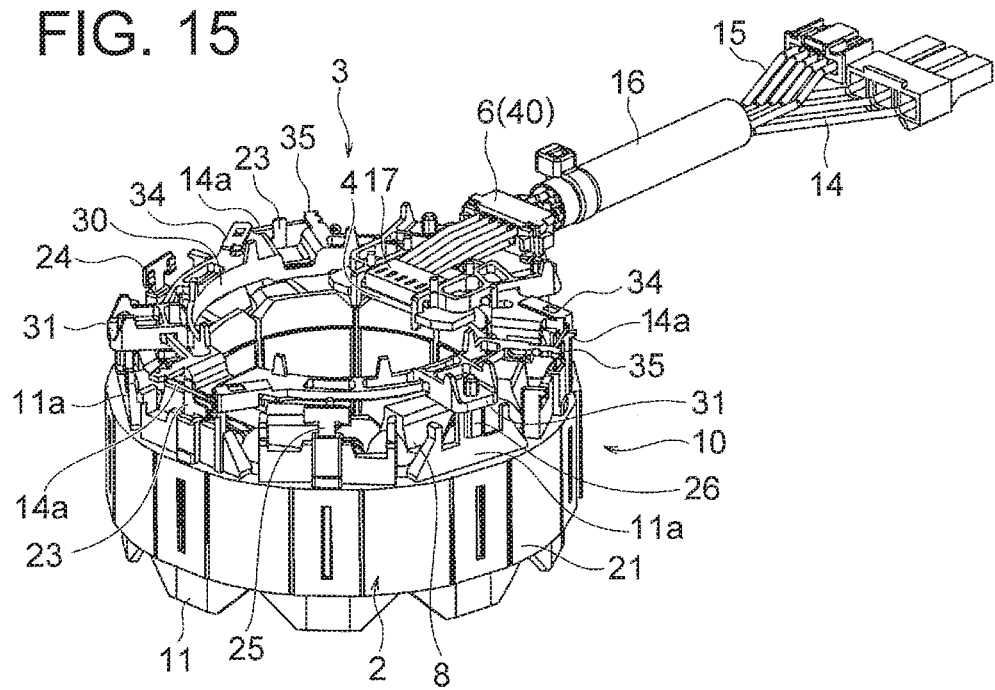
FIG. 15 is a perspective view illustrating a state in which the lead wire wiring component is attached to the stator assembly of the first embodiment.

Subsequently, the lead wire wiring component 3 is attached to the stator assembly 10 (step S5). FIG. 15 is a perspective view illustrating a state in which the lead wire wiring component 3 is attached to the stator assembly 10. The leg portions 31 of the lead wire wiring component 3 contact the upper surface of the outer wall portion 11a of the stator assembly 10, and the pins 26 of the stator assembly 10 engage with the holes 32 of the leg portions 31. In addition, the pins 26 are thermally welded to the leg portions 31. The core wires of the power lead wires 14 arranged on the lead wire wiring component 3 are spot-welded to the power terminals 23 of the stator assembly 10.

When the lead wire wiring component 3 is attached to the stator assembly 10 in this manner, the lead wire wiring component 3 contacts the upper surfaces of the spacers 8 and hold the spacers 8 so that the spacers 8 are not detached from the stator assembly 10. In this regard, the spacers 8 may be placed in the stator assembly 10 through the openings 30a of the lead wire wiring component 3 (FIGS. 4 and 5) after the lead wire wiring component 3 is attached to the stator assembly 10.

Then, the stator assembly 10 to which the lead wire wiring component 3 is attached is placed in a molding mold, and is integrally molded using the molding resin (step S6 in FIG. 12). This step is referred to as a molding step.

Figure 16:
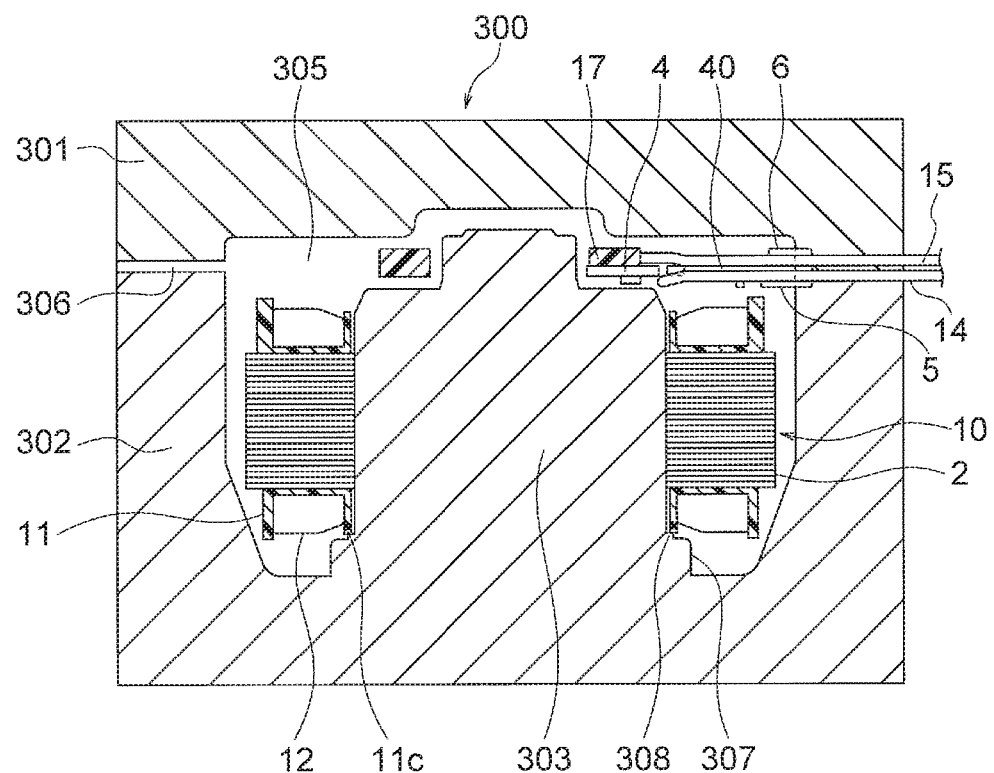
FIG. 16 is a schematic view illustrating a basic structure of a molding mold of the first embodiment.

FIG. 16 is a schematic view for describing a structure of the molding mold 300 used for molding. The molding mold 300 includes an upper mold 301 and a lower mold 302 that are openable and closable, and a cavity 305 is formed between the upper and lower molds 301 and 302. A runner 306 that is a channel for injecting a resin into the cavity 305 is formed between the upper mold 301 and the lower mold 302. The runner 306 leads to an upper end portion of the cavity 305. In this regard, the spacers 8 placed in the stator assembly 10 are omitted in FIG. 16.

In the lower mold 302, a cylindrical center core 303 is formed to protrude into the cavity 305. The center core 303 is a portion that engages with an inner side of the stator assembly 10. A step portion 308 is formed on the center core 303, and the step portion 308 protrudes radially outward from an outer circumferential surface of the center core 303. A larger-diameter portion 307 is formed on a lower end portion of the center core 303, and the larger-diameter portion 307 further protrudes radially outward from the step portion 308. The larger-diameter portion 307 is a portion corresponding to the opening 19 (FIG. 10) of the stator 1.

The step portion 308 contacts the projections 11c formed on a lower end portion of the inner wall portion 11b (FIG. 1) of the stator assembly 10, and supports the stator assembly 10. With this structure in which the stator assembly 10 is supported from radially inside, the stator assembly 10 need not be supported from radially outside. Thus, the stator assembly 10 can be completely covered with the molding resin 13 from radially outside. In other words, an interface between the stator core 2 (or the insulating portion 11) and the molding resin 13 is prevented from being exposed to an outer side of the stator 1. Accordingly, moisture or the like is prevented from entering into the stator 1, and quality of the stator 1 is enhanced.

In this example, the projections 11c of the stator assembly 10 are supported by the step portion 308. Instead of providing the step portion 308, it is also possible to provide, for example, a plurality of claws protruding radially outward from the outer circumferential surface of the center core 303. Alternatively, it is also possible to provide a plurality of projections on an upper surface of the larger-diameter portion 307 so that the projections are not connected to the center core 303. In the latter case (i.e., the case where the plurality of projections which are not connected to the center core 303 are provided on the upper surface of the larger-diameter portion 307), the molding resin enters into an inner circumferential side of the insulating portion 11 to reach the outer circumferential surface of the center core 303. Thus, for example, the interface between the insulating portion 11 and the molding resin is prevented from being exposed to an inner side of the stator 1. Thus, the effect of preventing moisture or the like from entering into the stator 1 is further enhanced.

At the time of molding, the upper mold 301 is moved upward to open the cavity 305, and the stator assembly 10 to which the lead wire wiring component 3 and the spacers 8 are attached is placed in the cavity 305. A part of the lead-out portion 40 of the lead wire wiring component 3, a part of the power lead wire holding component 5, and a part of the sensor lead wire holding component 6 protrude outside of the cavity 305.

Thereafter, the upper mold 301 is moved downward to close the cavity 305, and the molding resin in a melted state is injected into the cavity 305 from the runner 306. The molding resin injected into the cavity 305 covers the stator assembly 10 and the lead wire wiring component 3. The molding resin also enters into between the winding portions 12a of the coil 12 (around the spacers 8).

As described above, since the spacers 8 shaped from the plastic material of which the molding resin is composed are already placed in the gaps between the winding portions 12a of the coil 12 of the stator assembly 10, an amount of the molding resin injected from the runner 306 is small.

After the molding resin is injected into the cavity 305, the molding mold 300 is heated. Accordingly, the molding resin in the cavity 305 is cured. That is, the stator assembly 10 and the lead wire wiring component 3 are integrally molded using the molding resin, and thereby the stator 1 is formed. Moreover, the spacers 8 are integrated with the molding resin shaped from the identical material.

After the molding step is completed, the stator 1 is taken out from the molding mold 300. Thus, manufacturing of the stator 1 of this embodiment is completed. At this time, the resin cured in the runner 306 of the molding mold 300 is taken out, and is used as the spacer 8 (FIG. 13) in the molding step of the next stator 1.

Although the runner 306 is illustrated as a linear groove in FIG. 16, the runner 306 has a shape similar to that of the spacer 8 illustrated in FIG. 13. That is, the runner 306 extends as a cylindrical groove similar to the insertion portion 81 of the spacer 8 (FIG. 13), and a gate portion leading to the cavity 305 has a shape similar to the engaging portion 82 of the spacer 8. Thus, the resin (a cured body) taken out from the runner 306 can be used as the spacer 8 in the next molding step. The resin taken out from the runner 306 may also be processed before being used.

After the stator 1 is manufactured as described above, the motor 100 is assembled (step S7). That is, as illustrated in FIG. 10, the shaft 73 to which the rotor 7 and the bearings 74 are attached is inserted into the stator 1 through the opening 19. Moreover, the bracket 75 is attached to the opening 19 of the stator 1. In addition, a waterproof cap 76 for preventing water or the like from entering into the bearings 74 is attached to an outer side of the bracket 75. Thus, manufacturing of the motor 100 is completed.

In this example, the resin taken out from the runner 306 of the molding mold 300 is used as the spacer 8 in the next molding step. However, a resin other than that taken out from the runner 306 may be used as long as the resin is shaped from a plastic material identical with a plastic material of which the molding resin 13 is composed.

Moreover, in this example, the stator assembly 10 to which the lead wire wiring component 3 is attached is placed in the molding mold 300. However, the lead wire wiring component 3 may be attached to the stator assembly 10 after the stator assembly 10 is placed in the molding mold 300.

As described above, in the first embodiment of the present invention, the spacer 8 shaped from a plastic material identical with a plastic material of which the molding resin 13 is composed is inserted into the gap between the winding portions 12a (the first winding portion 121 and the second winding portion 122) wound around the adjacent teeth 22 (the first tooth 221 and the second tooth 222) of the stator core 2. With this structure, the amount of use of the molding resin can be reduced, and manufacturing cost of the stator 1 can be reduced.

In addition, since the spacers 8 are equally arranged in the stator core 2, variation in density of the molding resin in the stator 1 can be reduced, and quality of the stator 1 can be enhanced.

Moreover, since the resin cured in the runner 306 of the molding mold 300 in the previous molding step (in other words, the molding step already performed) is used as the spacer 8, manufacturing cost can be further reduced by reuse of the resin.

Moreover, since the spacer 8 includes the insertion portion 81 inserted into the gap between adjacent winding portions 12a and the engaging portion 82 engaging the winding portion 12a, positional displacement and detachment of the spacer 8 can be prevented. Thus, quality of the stator 1 can be enhanced, and the manufacturing process can be simplified.

Moreover, since the insertion portion 81 of the spacer 8 is elongated in one direction and the engaging portion 82 is formed at an end portion of the insertion portion 81 in the longitudinal direction, the insertion portion 81 can be inserted into between the winding portions 12a, and the engaging portion 82 can be placed in a space above the winding portions 12a. Thus, the spacer 8 of a larger size can be used, and thereby the amount of use of the resin can be further reduced.

Moreover, since the engaging portion 82 of the spacer 8 has a shape protruding from the insertion portion 81 in a plane perpendicular to the longitudinal direction of the insertion portion 81, the effect of preventing detachment of the spacer 8 from the coil 12 can be enhanced.

Moreover, a spacer holding member (for example, the lead wire wiring component 3) is provided in contact with the spacers 8, and therefore the effect of preventing detachment of the spacers 8 from the coil 12 can be enhanced.

Moreover, since the lead wire wiring component 3 on which the power lead wires 14 are arranged is used as the spacer holding member, the number of parts to be used can be reduced, and manufacturing cost can be further reduced.

Moreover, since the manufacturing cost of the stator 1 is reduced as described above, manufacturing cost of the motor 100 including the stator 1 can be reduced.

Further, since the manufacturing cost of the stator 1 is reduced as described above, manufacturing cost of the air conditioning apparatus 200 using the motor 100 including the stator 1 can be reduced.

Moreover, in the first embodiment of the present invention, the stator 1 is manufactured through the step of preparing the stator core 2 including the adjacent teeth 22 (the first tooth 221 and the second tooth 222), the step of winding the winding portions 12a (the first winding portion 121 and the second winding portion 122) of the coil 12 around the teeth 22, the step of inserting the spacer 8 shaped from a plastic material identical with a plastic material of which the molding resin 13 is composed into the gap between the winding portions 12a, and the molding step of integrally molding the stator core 2, the coil 12, and the spacer 8 using the molding resin 13. Since integral molding is performed using the molding resin 13 while the spacer 8 is disposed between the winding portions 12a in this manner, the amount of use of the molding resin can be reduced, and thereby the manufacturing cost of the stator 1 can be reduced.

Second Embodiment

Next, a second embodiment of the present invention will be described. In order to reduce manufacturing cost, simplification of the manufacturing process as much as possible is required in addition to reduction of the amount of use of the molding resin. The second embodiment is intended to further simplify the manufacturing process in addition to reduction of the amount of use of the molding resin.

Figure 17:
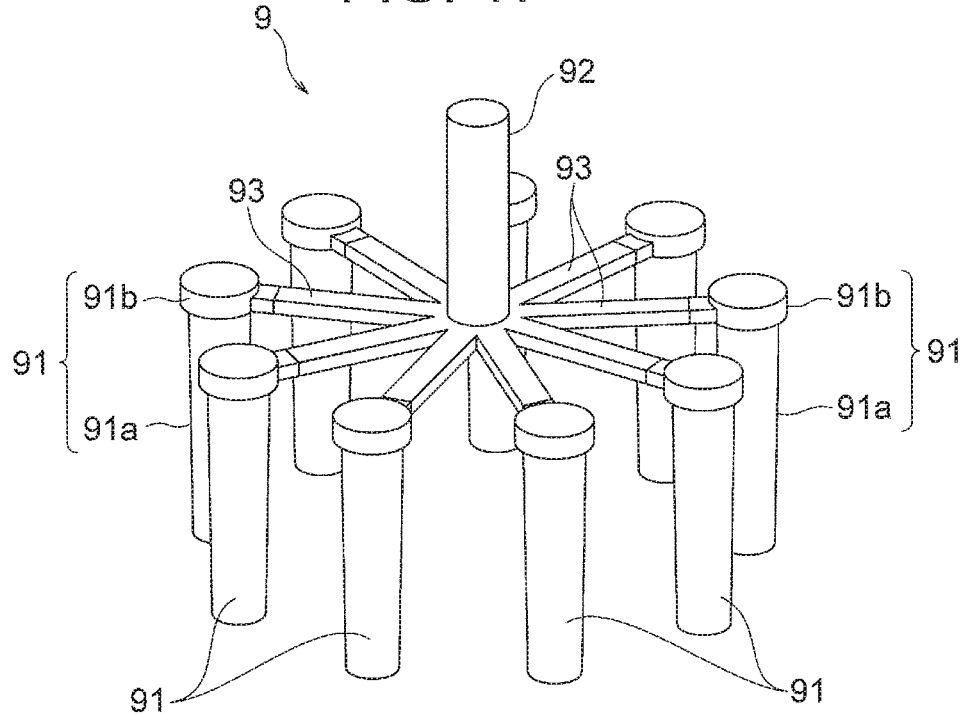
FIG. 17 is a perspective view illustrating a structure of a spacer assembly of a second embodiment.

In this second embodiment, a spacer assembly 9 as an integrated body of a plurality of spacers 91 is used. FIG. 17 is a perspective view illustrating a shape of the spacer assembly 9 according to the second embodiment. The spacer assembly 9 of the second embodiment includes a plurality of spacers 91 (spacer elements) inserted into a plurality of gaps between the winding portions 12a of the coil 12. In this embodiment, the number of the spacers 91 is equal to the number (nine) of the gaps between the winding portions 12a. As is the case with the spacers 8 of the first embodiment, the spacer assembly 9 is shaped from a plastic material identical with a plastic material of which the molding resin is composed.

Each of the spacers 91 includes an insertion portion 91a having a cylindrical shape and a larger-diameter portion 91b (an engaging portion) formed at an end portion of the insertion portion 91a in an axial direction of the insertion portion 91a. The insertion portion 91a has a diameter smaller than the distance between the adjacent winding portions 12a of the coil 12. In this regard, the shape of the insertion portion 91a is not limited to the cylindrical shape, but may be, for example, a prism shape. The larger-diameter portion 91b has a diameter larger than the distance between the adjacent winding portions 12a of the coil 12. Axial directions of the spacers 91 of the spacer assembly 9 are parallel with each other.

The spacer assembly 9 includes a columnar portion 92 provided at a center position equally distanced from the spacers 91 and connecting portions 93 extending from the columnar portion 92 to the spacers 91. The columnar portion 92 has a cylindrical shape whose axial direction is parallel with the spacers 91. The connecting portions 93 radially extend from an end portion of the columnar portion 92 (a lower end portion in FIG. 17) toward the plurality of spacers 91, and connect the plurality of spacers 91 with each other.

Figure 18:
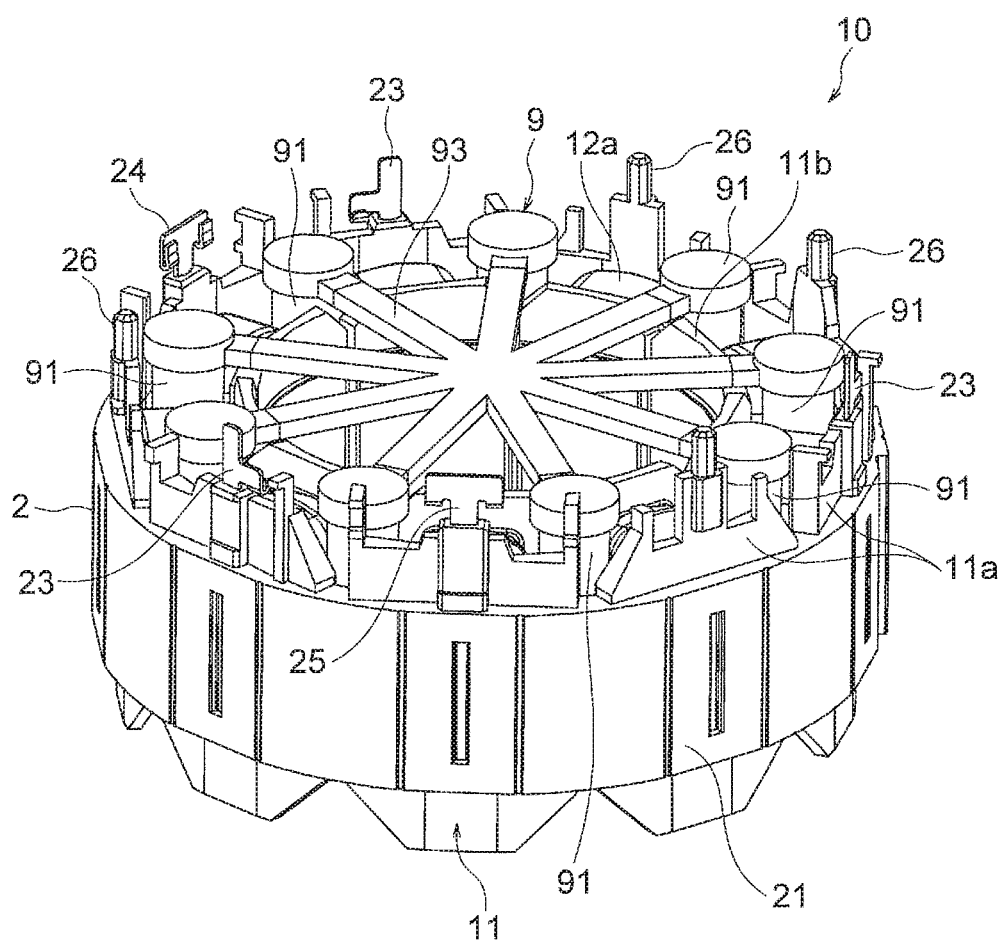
FIG. 18 is a view illustrating a state in which spacers of the second embodiment are placed in a stator assembly.

FIG. 18 is a view illustrating a state in which the spacer assembly 9 is attached to the stator assembly 10. A length of the connecting portion 93 of the spacer assembly 9 corresponds to a distance from the center of the stator assembly 10 to the gap between the winding portions 12a of the coil 12. Thus, an operator can insert the spacers 91 (the insertion portions 91a) into the gaps between the winding portions 12a of the coil 12 while gripping the columnar portion 92 of the spacer assembly 9.

The state of FIG. 18 is obtained by inserting the spacers 91 into the gaps between the winding portions 12a of the coil 12 and then cutting the columnar portion 92 off from the connecting portions 93. Moreover, parts of the connecting portions 93 of the spacer assembly 9 protruding radially inward from inner wall portion 11b of the stator assembly 10 are cut off before the stator assembly 10 is placed in a molding mold 400. The outer shape of the larger-diameter portion 91b is larger than the gap between the winding portions 12a as described above, and thus the spacer 91 is prevented from being detached downward through the gap between the winding portions 12a.

Thereafter, the lead wire wiring component 3 (FIG. 15) described in the first embodiment is attached to the stator assembly 10. In this manner, the spacers 91 of the spacer assembly 9 are pressed from above by the lead wire wiring component 3, and positional displacement and detachment of the spacers 91 are prevented.

The stator assembly 10 to which the lead wire wiring component 3 and the spacer assembly 9 are attached in this manner is placed in the molding mold, and the stator assembly 10, the lead wire wiring component 3, and the spacer assembly 9 are integrally molded using the molding resin. That is, a molding step is performed.

Figure 19:
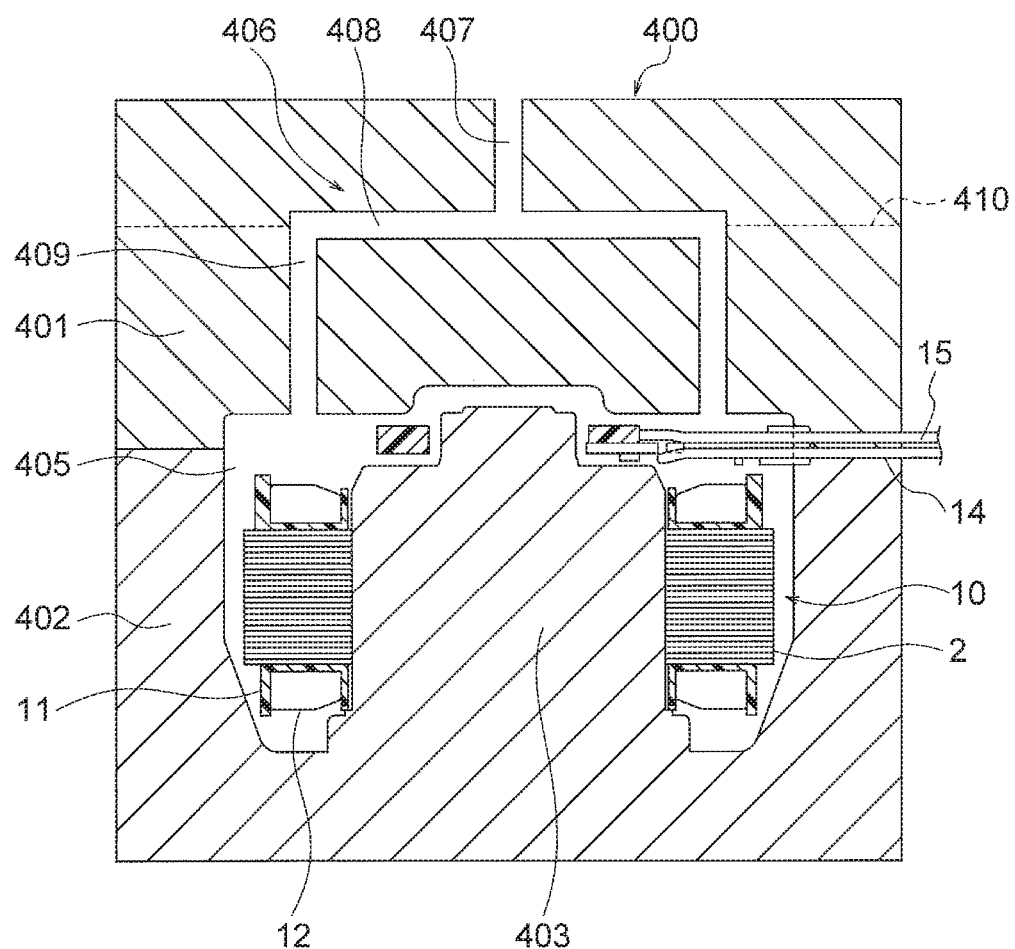
FIG. 19 is a schematic view illustrating a basic structure of a molding mold of the second embodiment.

FIG. 19 is a schematic view illustrating an example of a molding mold 400 used in the second embodiment. The molding mold 400 includes an upper mold 401 and a lower mold 402, and a cavity 405 is formed between the upper and lower molds 401 and 402. A runner 406 that is a channel for injecting a resin into the cavity 405 is formed in the upper mold 401. In this regard, the spacers 91 placed in the stator assembly 10 are omitted in FIG. 19.

The runner 406 includes a first runner portion 407 extending vertically, second runner portions 408 extending radially from the first runner portion 407 to positions corresponding to the stator core 2 of the stator assembly 10, and third runner portions 409 extending downward from terminal ends of the second runner portions 408. The upper mold 401 is configured to be divisible at a division surface indicated by, for example, reference sign 410 so that a resin cured in the runner 406 can be taken out.

In the lower mold 402, a cylindrical center core 403 is formed to protrude into the cavity 405. A structure of the center core 403 is similar to that of the center core 303 illustrated in FIG. 16.

The molding resin injected from the runner 406 into the cavity 405 covers the stator assembly 10, the lead wire wiring component 3, and the spacers 91. Thereafter, the molding mold 400 is heated, so that the stator assembly 10 and the lead wire wiring component 3 are integrally molded using the molding resin. The spacers 91 are integrated with the molding resin composed of the identical material. In this manner, a stator 1A is molded.

Figure 20:
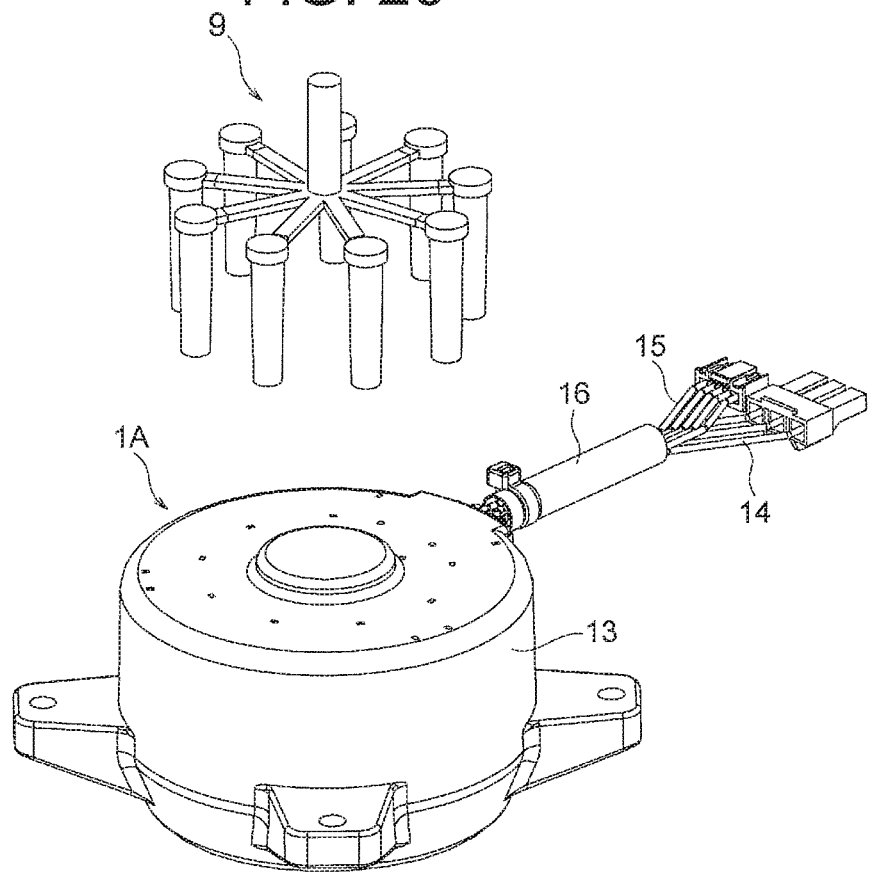
FIG. 20 is a perspective view illustrating a stator and the spacer assembly of the second embodiment.

After the molding step is completed, the stator 1A is taken out from the molding mold 400. Thus, manufacturing of the stator 1A of this embodiment is completed. In this regard, FIG. 20 illustrates the spacer assembly 9 together with the stator 1A.

At this time, the resin cured in the runner 406 of the molding mold 400 is taken out and is used as the spacer assembly 9 in the molding step of the next stator 1A. In this case, the resins cured in the first runner portion 407, the second runner portions 408 and the third runner portions 409 of the molding mold 400 respectively become the columnar portion 92, the connecting portions 93 and the spacers 91 of the spacer assembly 9.

A structure of the stator 1A of the second embodiment is similar to that of the stator 1 described in the first embodiment except for the use of the spacer assembly 9. Structures of a motor and an air conditioning apparatus using the stator 1A of the second embodiment are similar to those of the motor 100 and the air conditioning apparatus 200 described in the first embodiment.

As described above, according to the second embodiment of the present invention, since the spacer assembly 9 includes the plurality of spacers 91, the plurality of spacers 91 can be inserted into the gaps between the winding portions 12a of the coil 12 in a small number of steps, in addition to the advantages described in the first embodiment. Therefore, the manufacturing process can be simplified.

Moreover, since the number of the spacers 91 of the spacer assembly 9 is equal to the number of the gaps between the winding portions 12a of the coil 12, the plurality of spacers 91 can be inserted into the gaps between the winding portions 12a of the coil 12 all at once. Thus, the manufacturing process can be further simplified.

Moreover, since the spacer assembly 9 includes the columnar portion 92 and the connecting portions 93 extending radially from the columnar portion 92 to the plurality of spacers 91, the spacer assembly 9 can be attached to the stator assembly 10 by, for example, gripping the columnar portion 92. Thus, the manufacturing process can be further simplified.

Third Embodiment

Next, a third embodiment of the present invention will be described. In order to reduce the amount of the molding resin of the stator 1, it is also effective to provide a hollow portion in the stator 1. The third embodiment is intended to further reduce the amount of use of the molding resin by providing a hollow portion inside a spacer.

Figure 21:
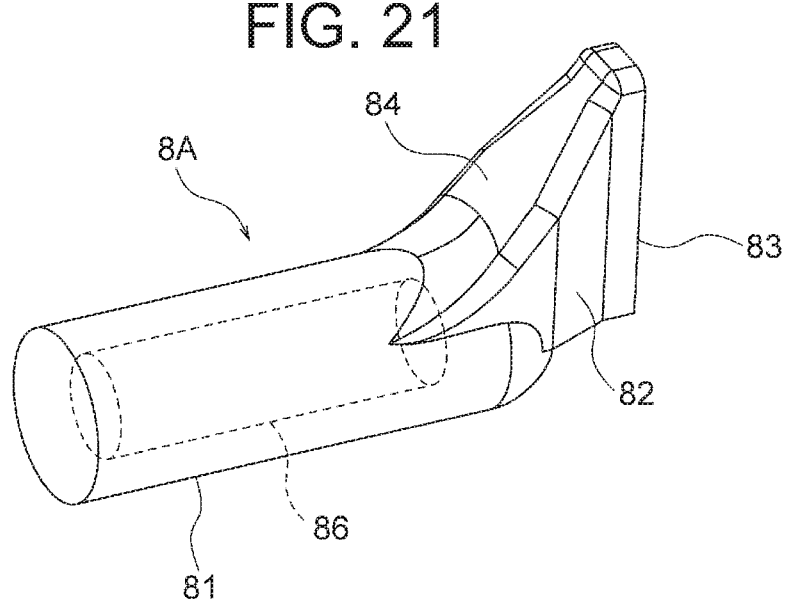
FIG. 21 is a perspective view illustrating a structure of a spacer of a third embodiment of the present invention.

FIG. 21 is a perspective view illustrating a shape of a spacer 8A according to the third embodiment. The spacer 8A of the third embodiment has a shape similar to that of the spacer 8 of the first embodiment, but is different from the spacer 8 of the first embodiment in that the spacer 8A has a hollow portion 86 therein. As described in the first embodiment, the spacer 8A of the third embodiment is shaped from a plastic material identical with a plastic material of which the molding resin is composed.

In the third embodiment, the spacer 8A having the hollow portion 86 is inserted between the winding portions 12a of coil 12, and molding is performed. Thus, as compared with the first embodiment, the amount of the molding resin can be reduced by an amount corresponding to a volume of the hollow portion 86. In this regard, although the hollow portion 86 is provided inside the insertion portion 81 of the spacer 8A in FIG. 21, the hollow portion may be provided in the engaging portion 82.

A structure of a stator of the third embodiment and a method of manufacturing the stator are similar to the structure of the stator 1 and the method of manufacturing the stator 1 described in the first embodiment except for the use of the spacer 8A. Structures of a motor and an air conditioning apparatus using the stator of the third embodiment are also similar to those of the motor 100 and the air conditioning apparatus 200 described in the first embodiment.

As described above, according to the third embodiment of the present invention, since the spacer 8A having the hollow portion 86 therein is used, the amount of use of the molding resin can be further reduced, and manufacturing cost can be further reduced.

In the third embodiment, although the hollow portion is provided inside the spacer 8 described in the first embodiment, similar advantages can be obtained when the hollow portion is provided inside the spacer 91 of the second embodiment.

What is claimed is:

1. A stator comprising:
   a stator core having a first tooth and a second tooth adjacent to each other;
   a coil having a first winding portion wound around the first tooth and a second winding portion wound around the second tooth;
   a spacer inserted into a gap between the first winding portion and the second winding portion, and
   a molding resin covering the stator core, the coil and the spacer,
   wherein the spacer is shaped from a plastic material identical with a plastic material of which the molding resin is composed, and
   wherein the spacer has:
   an insertion portion inserted into the gap between the first winding portion and the second winding portion, and
   an engaging portion engaging at least one of the first winding portion and the second winding portion, and
   wherein the spacer is obtained by cutting a spacer assembly in which a plurality of spacer elements are integrated.

2. The stator according to claim 1, wherein the spacer is cured in a runner of a mold in a molding step of the stator which is previously performed.

3. The stator according to claim 1, wherein the insertion portion of the spacer is elongated in one direction, and
wherein the engaging portion of the spacer is formed at an end portion of the insertion portion in a longitudinal direction of the insertion portion.

4. The stator according to claim 1, wherein the engaging portion of the spacer protrudes from the insertion portion in a plane perpendicular to the longitudinal direction of the insertion portion.

5. The stator according to claim 1, wherein the spacer has a hollow portion.

6. The stator according to claim 1, wherein a spacer holding member is provided on the stator core, the spacer holding member holding the spacer against the stator core.

7. The stator according to claim 6, wherein the spacer holding member is a wiring component on which a lead wire is arranged.

8. A motor comprising a stator and a rotor provided inside the stator, the stator comprising:
a stator core having a first tooth and a second tooth adjacent to each other;
a coil having a first winding portion wound around the first tooth and a second winding portion wound around the second tooth;
a spacer inserted into a gap between the first winding portion and the second winding portion, and
a molding resin covering the stator core, the coil and the spacer,
wherein the spacer is shaped from a plastic material identical with a plastic material of which the molding resin is composed, and
wherein the spacer has:
an insertion portion inserted into the gap between the first winding portion and the second winding portion, and
an engaging portion engaging at least one of the first winding portion and the second winding portion, and
wherein the spacer is obtained by cutting a spacer assembly in which a plurality of spacer elements are integrated.

9. An air conditioning apparatus comprising:
an outdoor unit having a first fan and a first motor to drive the first fan;
an indoor unit having a second fan and a second motor to drive the second fan, and
a refrigerant pipe connecting the outdoor unit and the indoor unit,
wherein at least one of the first motor and the second motor has a stator and a rotor provided inside the stator, wherein the stator comprises:
a stator core having a first tooth and a second tooth adjacent to each other;
a coil having a first winding portion wound around the first tooth and a second winding portion wound around the second tooth;
a spacer inserted into a gap between the first winding portion and the second winding portion, and
a molding resin covering the stator core, the coil and the spacer,
wherein the spacer is shaped from a plastic material identical with a plastic material of which the molding resin is composed, and
wherein the spacer has:
an insertion portion inserted into the gap between the first winding portion and the second winding portion, and
an engaging portion engaging at least one of the first winding portion and the second winding portion, and
wherein the spacer is obtained by cutting a spacer assembly in which a plurality of spacer elements are integrated.

10. A method of manufacturing a stator, the method comprising the steps of:
preparing a stator core having a first tooth and a second tooth adjacent to each other;
winding a first winding portion of a coil around the first tooth and winding a second winding portion of the coil around the second tooth;
inserting a spacer into a gap between the first winding portion and the second winding portion, the spacer being shaped from a plastic material identical with a plastic material of which a molding resin is composed, and
integrally molding the stator core, the coil and the spacer using the molding resin, and
wherein the spacer has:
an insertion portion inserted into the gap between the first winding portion and the second winding portion, and
an engaging portion engaging at least one of the first winding portion and the second winding portion;
wherein the spacer used in the inserting step is obtained by cutting a spacer assembly in which a plurality of spacer elements are integrated.

11. The method of manufacturing the stator according to claim 10, wherein a resin cured in a runner of a mold in the molding step which is previously performed is used as the spacer.

12. The method of manufacturing the stator according to claim 10, wherein the coil has a plurality of winding portions having the first winding portion and the second winding portion, and a plurality of gaps each of which is provided between adjacent two winding portions of the plurality of winding portions,
wherein a number of the plurality of spacer elements equals to a number of the plurality of gaps.

13. The method of manufacturing the stator according to claim 10, wherein the spacer assembly further has connecting portions to connect the plurality of spacer elements.

14. The method of manufacturing the stator according to claim 13, wherein the spacer assembly further has a columnar portion equally distanced from the spacer elements, the connecting portions extending from the columnar portion to the plurality of spacer elements.

* * * * *